(12) United States Patent
Hoogland

(10) Patent No.: US 6,591,779 B1
(45) Date of Patent: Jul. 15, 2003

(54) DISPLAY BIRD FEEDER

(75) Inventor: Frank Michael Hoogland, Holland, MI (US)

(73) Assignee: Seed Resources, L.L.C., Grand Rapids, MI (US)

( * ) Notice: Subject to any disclaimer, the term of this patent is extended or adjusted under 35 U.S.C. 154(b) by 0 days.

(21) Appl. No.: 10/039,265

(22) Filed: Jan. 4, 2002

(51) Int. Cl.$^7$ .............................................. A01K 39/01
(52) U.S. Cl. .................... 119/51.03; 119/57.8; 119/464
(58) Field of Search .......................... 119/51.03, 57.8, 119/467, 468, 477, 708, 709, 710, 711, 464, 475, 515

(56) References Cited

U.S. PATENT DOCUMENTS

| | | | |
|---|---|---|---|
| 1,092,314 A | | 4/1914 | White |
| D85,404 S | | 10/1931 | Townley |
| 2,504,282 A | | 4/1950 | Tobias |
| 3,083,687 A | | 4/1963 | Slaven |
| 3,273,537 A | * | 9/1966 | Orr .......................... 119/51.03 |
| 3,398,719 A | | 8/1968 | Walker |
| 4,173,200 A | | 11/1979 | Olsen et al. |
| 4,223,637 A | | 9/1980 | Keefe |
| 4,570,574 A | | 2/1986 | Burkholder |
| 4,607,597 A | | 8/1986 | Sevigny |
| 4,966,098 A | * | 10/1990 | Freeman .................... 119/52.2 |
| 5,016,573 A | * | 5/1991 | Power ......................... 119/428 |
| 5,076,214 A | | 12/1991 | Petit |
| 5,123,378 A | * | 6/1992 | Bayne ......................... 119/464 |
| D330,953 S | | 11/1992 | Schneider |
| 5,195,460 A | | 3/1993 | Loken |
| D351,691 S | | 10/1994 | Lipton |
| D360,496 S | | 7/1995 | Norman |
| 5,533,467 A | | 7/1996 | Lancia |
| D376,877 S | | 12/1996 | Hardison |
| 5,699,752 A | * | 12/1997 | Wilkins .................... 119/51.03 |
| 5,758,596 A | | 6/1998 | Loiselle |
| 5,806,458 A | * | 9/1998 | Harwich .................. 119/51.03 |
| 5,826,539 A | | 10/1998 | Bloedorn |
| 5,826,541 A | * | 10/1998 | Wilkins ..................... 119/57.8 |
| 5,887,542 A | * | 3/1999 | Sladowski ............... 119/51.03 |
| 5,970,913 A | * | 10/1999 | Bloedorn .................. 119/57.8 |
| 6,024,047 A | * | 2/2000 | Hoogland ................... 119/467 |

FOREIGN PATENT DOCUMENTS

SE            157822           2/1957

* cited by examiner

*Primary Examiner*—Robert P. Swiatek
(74) *Attorney, Agent, or Firm*—Miller, Johnson, Snell & Cummiskey, P.L.C.

(57) ABSTRACT

An animal feeder and particularly a bird feeder having a construction that allows bird seed cakes of various ornamental designs to freely hang while providing a separate area for multiple visiting birds to perch. The grid-patterned perch hangs around the cake, thereby minimizing both premature destruction of the cake and obstructions to a view of the visiting birds and the decoratively shaped seed cake.

9 Claims, 2 Drawing Sheets

DISPLAY BIRD FEEDER

BACKGROUND OF THE INVENTION

1. Field of the Invention

This invention relates generally to animal feeders and particularly to a unique bird feeder for seed cakes having three dimensional ornamental shapes and providing a separate area generally around the cake for visiting birds to perch.

2. Background of the Invention

Conventional bird feeders constitute a container of sorts which retains loose bird seed and dispenses it into a bowl when a certain amount of the seed has been consumed, providing essentially a constant source of food so long as there is a supply in the container. Prior to these "bin" type feeders, the loose bird seed was simply deposited into a dish or loosely spread on a surface for the birds to eat.

Other feeders use a wire holder to retain a solid bar or cake of seed. Such solid bar or cakes are often referred to a bird-seed or suet-cakes, and are generally placed in a wire container cage so that squirrels or other animals don't carry the cake away. For purposes of clarity, both products will be referred to generally as cakes. Moreover, the wire containers have been designed to have horizontally disposed perches for the birds to rest while they feed.

Some cake products have been designed and shaped into ornamental shapes rather than the more simply designed block or bars. Such cakes have been formed to look like bells, balls, pine cones, corn-on-the-cob, and the like. Substantially all are formed using by a mold process which lends itself to forming the cakes into a wide variety of shapes.

One of the disadvantages associated with the use of such ornamental cakes is that the animal grasps the cake with its claws in order to feed. This clawing action into the cake erodes the surface of the cake, causing the cake to deteriorate much more quickly than if the animals perched elsewhere. Moreover, many of the shaped products do not fit into the more conventional wire mesh cage feeders already on the market, nor do they work well with the more conventional bin-feeders designed for loose seed product.

SUMMARY OF THE INVENTION

It is a purpose of this invention to provide a feeder for use with ornamental, three-dimensional bird seed cakes which provides an attractive presentation for the homeowner, while simultaneously providing a perching structure for the animals to perch while feeding rather than on the product itself.

In its broadest form, the feeder assembly includes a substantially planar sheet of mesh formed from a plurality of interconnected strings rods or strands to define an array of geometric shapes, the mesh absent in a predetermined area interior of the array to define an opening in the mesh pattern. A hook member is provided which extends from the mesh into the opening, for providing a spot to hang an ornamental cake of feed. A hanger assembly is also provided, having one end attached to the mesh, and an opposite end configured to suspend the feeder from a substrate.

In another form of the invention, a substantially two-dimensional feeder assembly is provided which includes a substantially tabular sheet of mesh having a predetermined shape defined by a peripheral edge. An opening is defined to the interior of the tabular sheet of mesh configured to receive the ornamental cake. A hook member extends into the opening from the sheet of mesh to suspend the ornamental cake within the opening. A hanger assembly, having one end attached to the feeder is provided, and is configured such that the opposite end of the hanger may be used to suspend the feeder from a substrate.

In yet another form of the invention, a bird feeder is provided, comprising a tabular wire grid of predetermined dimensions, having an enlarged opening formed therein. A hanging member is attached to at least one edge of the tabular wire grid, and a hook member is attached to the wire grid and extends into the enlarged opening for hanging an ornamental bird seed cake thereon.

Different embodiments of the invention include a range of materials for constructing the feeders, including metal wire or rods, polymeric strands or rods, or a woven cloth mesh. To preserve the durability and strength of the mesh, the mesh may be coated with a polymeric material. The mesh may be formed to define any one of a number of different geometric shapes, including but not limited to, polygons such as triangles, squares, parallelograms, diamonds, hexagons, octagons, and the like. It is also contemplated the mesh may be formed from a disjointed array of interconnected strands or rods such that there is no inherent pattern displayed in the mesh or at the outer margins or periphery. Moreover, the mesh may be formed in the shapes of circles, squares, diamonds, triangles . . . virtually any shape which is desired for hanging the ornamental cakes.

The advantages offered by these feeders is that it provides a perch immediately adjacent the cake for the animals while feeding. This substantially reduces the premature destruction of the cake by the perching of the animals on the cake. Secondly, the planar or tabular shape of the feeder disposed around the cake is much less expensive to manufacture than the more conventional "bin" and wire cage feeders. Secondly, the substantially two-dimensional characteristic of the feeder provides flexibility in the forming of different geometric designs for flexibility in satisfying customer taste.

These and other objects, advantages, purposes, and features of the invention will become more apparent from a study of the following description taken in conjunction with the drawing figures described below.

BRIEF DESCRIPTION OF THE DRAWING FIGURE

DESCRIPTION OF THE INVENTION

Figure 1:
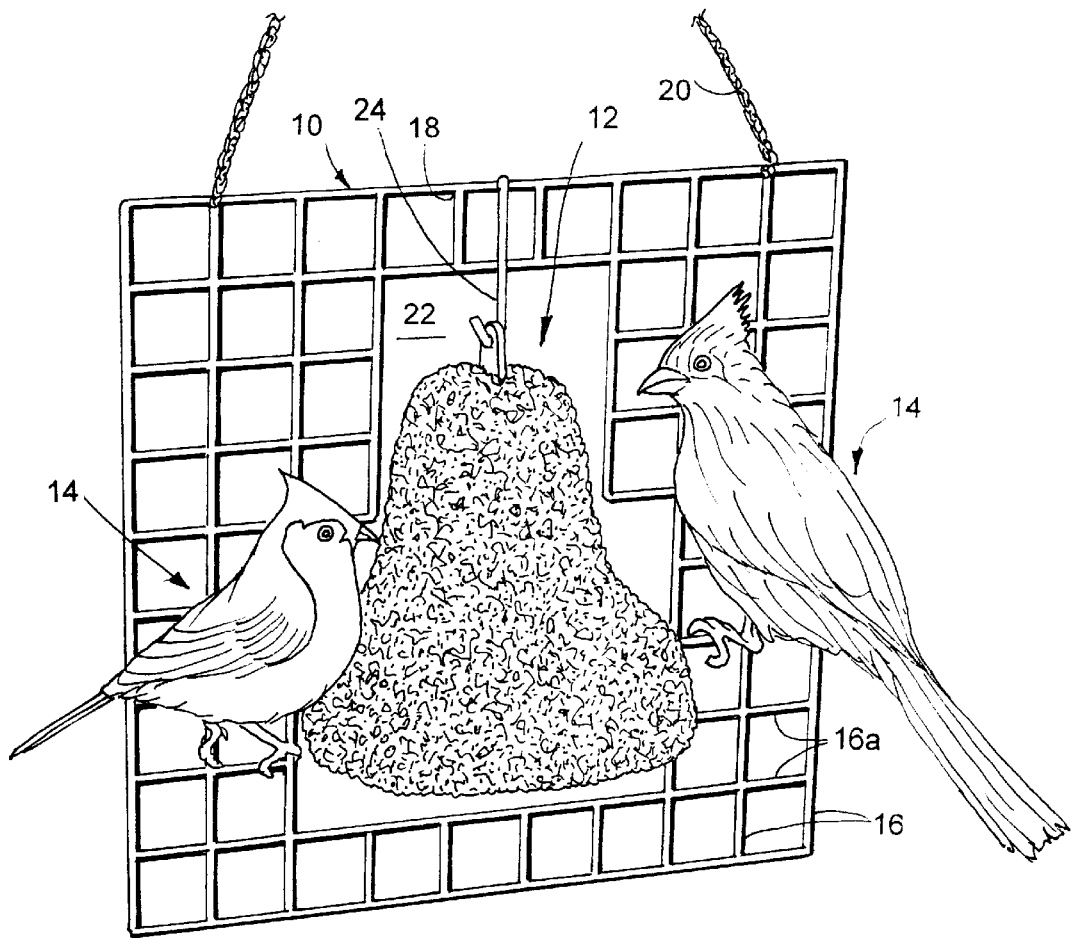
FIG. 1 is a schematic view of a feeder illustrating one embodiment of the invention with a hypothetical cake design suspended thereon, and illustrating the use of the invention as a perch for birds.

This invention is a bird feeder 10 that attractively displays a bird seed cake 12 of ornamental design while providing a separated perch for visiting birds generally identified by reference numerals 14. The bird feeder 10 is constructed to maximize the visibility of both the decorative seed cake 12 and visiting birds 14 by minimizing obstructions to viewing the feeder 10. The design provides a separate area for birds 14 to land, allowing them to feed on the cake 12 while the feeder 10 supports their weight, thereby prolonging the life of each seed cake 12.

Figure 2:
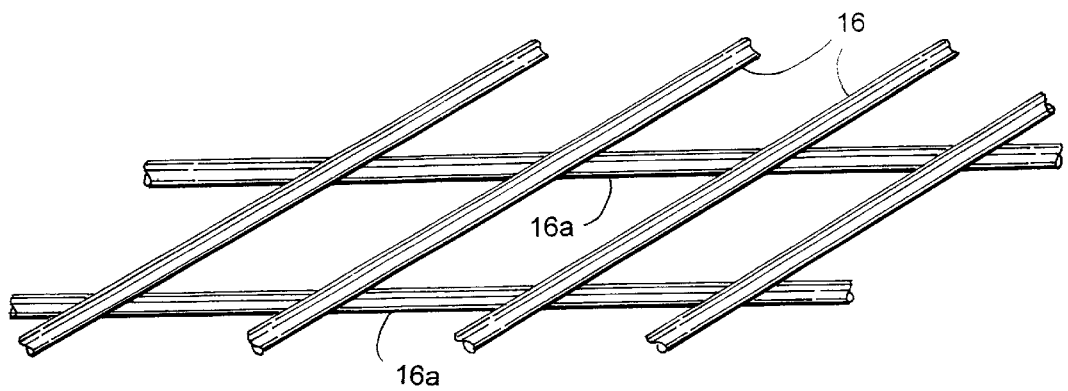
FIG. 2 is a fragmentary view through the feeder shown in FIG. 1.
Figure 3:
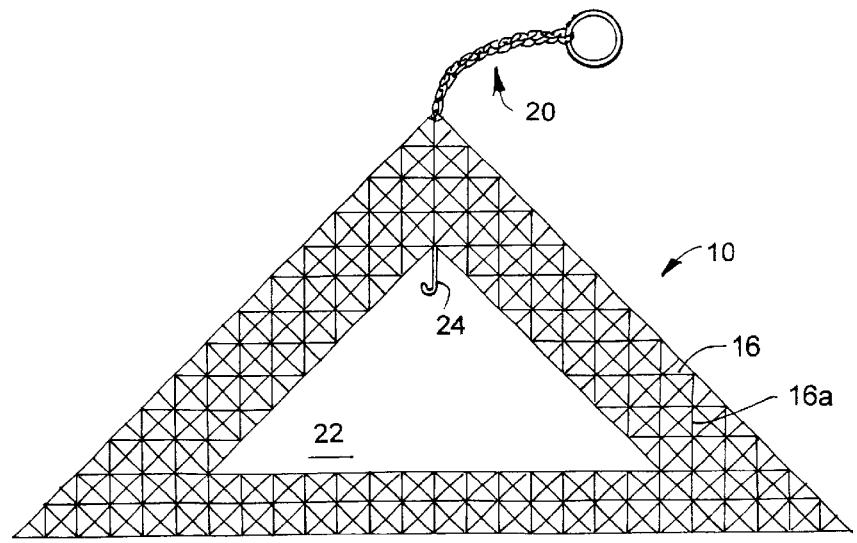
FIG. 3 is a schematic view of an alternate embodiment of the invention shown in FIG. 1, having a different geometric pattern in the mesh.

Referring to FIG. 1, one embodiment of the feeder 10 may be made from wire rod or strands 16 (FIG. 2) which are arranged in a substantially flat, planar or tabular grid-shaped pattern. The mesh strands or rods 16 are preferably made from wire between 8-and 18-gauge, and most preferably 14-to 16-gauge stock. A first row of rods or strands 16 may be overlain by a second row of rods or strands 16a at an angle to form the desired grid pattern. The wire strands or rods 16 may then be connected together using anyone of a number of techniques, including, but not limited to, welding attachment, adhesive, mechanical ties, or fasteners. For example, it is contemplated the rods or strands 16, 16a may be temporarily held in place by stake welds generated by passing an electrical load through the grid. Alternatively, a hot method may be used where the rods 16 are lain in the preferred pattern (such as shown in FIG. 3) substantially after formation at the steel plant, and then compressed such that upon cooling, the rods 16 are interconnected. Those of ordinary skill in the art of metal wire mesh will know how to tack or otherwise complete the making of the mesh.

To retain the rods or strands 16, 16a in place, and to retard corrosion of the materials, a polymeric coating 18 may be applied to the entire mesh. Together, the tacking together of the rods 16, 16a and the coating of polymeric material creates a sturdy mesh sheet.

Rather than using metal rods or strands generally referred to as numeral 16, other materials may also be used, including wood, extruded polymeric strands or rods, or injection molded grids of polymeric material. In addition, it is contemplated that strands or threads of either cloth or polymeric material may be woven together to produce a desired grid pattern. Depending upon the type of material being used, additional strengthening materials may be desired. For example, if a cloth thread is used to create a grid pattern, it may be desired to coat the cloth fibers with a polymeric material or plastic to give added stiffness to the grid. The encapsulation of the cloth fibers by the polymeric material may also retard the deleterious effects of ultraviolet radiation and other elements on the fabric. In particular, it is contemplated strips of wood, threads or yarns could be woven into anyone of a number of different patterns and provide the opening such as 22 for receiving the compressed cake of feed. In order to suspend the compressed feed cake, it is contemplated a plastic or other resin could encapsulate the wood, threads, or strands of the woven feeder to provide rigidity as well as protect the weave from the elements. Likewise, instead of cloth threads, it is contemplated that polymeric or resinous threads could be used in the weaving process. The resinous threads acting in concert should provide sufficient rigidity to the feeder once woven together. Irregardless of the type of material used to form the feeder, plastic, metal, or other hooks could be incorporated into the weave to provide a proper suspension point for the cake. In short, it is envisioned that substantially any material could be used to create a substantially stiff tabular sheet of predetermined geometric shape, having an area within its borders for suspending a feed product, wherein the tabular sheet provides a location for animals to cling to when feeding.

No matter what material is used to create the generally tabular or planar mesh substrate, the sheet of mesh material is suspended from a structure (not shown) by a hanging member 20 such as a chain having one end attached to the feeder 10 in a manner selected by the owner. The feeder 10 thus is intended to hang vertically from the chain 20. The placement of the hanging member 20 dictates in large part the hanging orientation of the feeder 10.

In one embodiment of the invention, a section of the wire grid pattern is absent, either upon formation, or by subsequent removal, to create an opening or space 22 in the interior of the mesh where the bird seed cake 12 can hang. In a preferred embodiment of the invention, the opening 22 may be designed to closely parallel a particular ornamental shaped of a cake 12, such as shown generally in FIG. 3. A hook member 24 which may be formed by one of the strands or rods 16 which extends into the opening 22 from the mesh, and from which the seed cake 12 is suspended.

In operation, the owner simply hangs a compressed bird seed cake 12, such as those sold under the BIRDOLA™ brand name from the hook 24 on the upper-inside border of the opening 22 of the wire or mesh. The bird seed cake 12 will have been formed into one of a number of predetermined dimensions around a hanger passing through and anchored to its interior. The hanger will have a loop or hole exposed at the top of the cake to allow placement of the hanger on the hook member 24. The bird seed cake 12 is formed to dimensions allowing it to essentially "fit" into the opening 22 of the mesh while hanging from the hook 24. In this manner, the birds 14 are able to land and perch on the mesh while having close access to the cake suspended thereon. Moreover, the essentially two-dimensional nature of the feeder acts as a mobile, swinging about the hanger, providing the owner various views of the birds attending the feeder.

The above description is considered that of the different embodiments only. Modifications of the invention will occur to those skilled in the art and to those who make or use the invention. Therefore, it is understood that the embodiment shown in these drawings and described herein are merely for illustrative purposes and not intended to limit the scope of the invention, which is defined by any claims in a subsequent or related application and interpreted according to the principals of patent law, including the doctrine of equivalence.

I claim:

1. A substantially two-dimensional feeder comprising:
   a sheet of mesh having a peripheral edge of predetermined geometric shape, said mesh defined by a network of interconnected geometric shapes;
   an opening within said peripheral edge defined by the absence of a plurality of said interconnected geometric shapes;
   a hook member extending into said opening from said sheet of mesh and adapted to suspend a compressed feed product therefrom; and
   a hanging member attached to said peripheral edge of said sheet of mesh and configured to suspend said sheet of mesh from a substrate at a predetermined attitude in space.

2. The feeder defined in claim 1, wherein each of said geometric shapes comprising said network includes one of a triangle, a diamond, a square, a rectangle, a hexagon, an octagon, a rhombus, and a parallelogram.

3. The feeder as defined in claim 1, wherein said mesh includes one made from one of wire, plastic, wood, and cloth.

4. The feeder as defined in claim 1, wherein said mesh includes a coating of polymeric material.

5. A feeder assembly, comprising:
   a planar sheet of mesh having a predetermined geometric shape; said mesh formed from a plurality of interconnected strands defining an array of geometric shapes; a predetermined portion of said array absent to define a predetermined geometric opening extending entirely through said planar sheet of mesh;

a hook member extending into said opening from at least one of said geometric shapes in said array for hanging a block of feed thereon; and at least one hanging member attached to said planar sheet of mesh and configured for suspending said planar sheet of mesh from a substrate.

6. The feeder assembly as defined in claim 5, wherein said planar sheet of mesh includes an array of interconnected polygons.

7. The feeder assembly as defined in claim 6, wherein said planar sheet of mesh includes a coating of a polymeric material.

8. The feeder assembly as defined in claim 6, wherein said planar sheet of mesh is fabricated from a polymeric material.

9. The feeder assembly is defined in claim 6, wherein said planar sheet of mesh is made from a woven material.

* * * * *